United States Patent [19]

Gambino

[11] 4,211,031
[45] Jul. 8, 1980

[54] WILD GOOSE AND DUCK CALL

[76] Inventor: Nate J. Gambino, 1224 Westland Dr., Modesto, Calif. 95350

[21] Appl. No.: 947,084

[22] Filed: Sep. 29, 1978

[51] Int. Cl.² ............................................. A63H 5/00
[52] U.S. Cl. ....................................... 46/177; 46/180
[58] Field of Search ......................... 46/177, 178, 180

[56] References Cited
U.S. PATENT DOCUMENTS

| 3,066,443 | 12/1962 | Mobley | 46/177 |
| 3,955,313 | 5/1976 | Faulk | 46/178 |

*Primary Examiner*—Houston S. Bell, Jr.

[57] ABSTRACT

A wild goose and duck call includes a hollow tubular body having a medially disposed blow hole extending through the side wall thereof. A pair of reed assemblies are secured in the open end of the tubular body, each reed assembly including a hollow, truncated conical member. Extending from the truncated portion of the conical member is a reed and tongue assembly which is held in place in the conical member by a compression plug. The free ends of the reeds are disposed generally adjacent to the blow hole. Either end of the instrument may be selectively blocked or muffled to produce many birdcall variations.

9 Claims, 5 Drawing Figures

U.S. Patent  Jul. 8, 1980  4,211,031
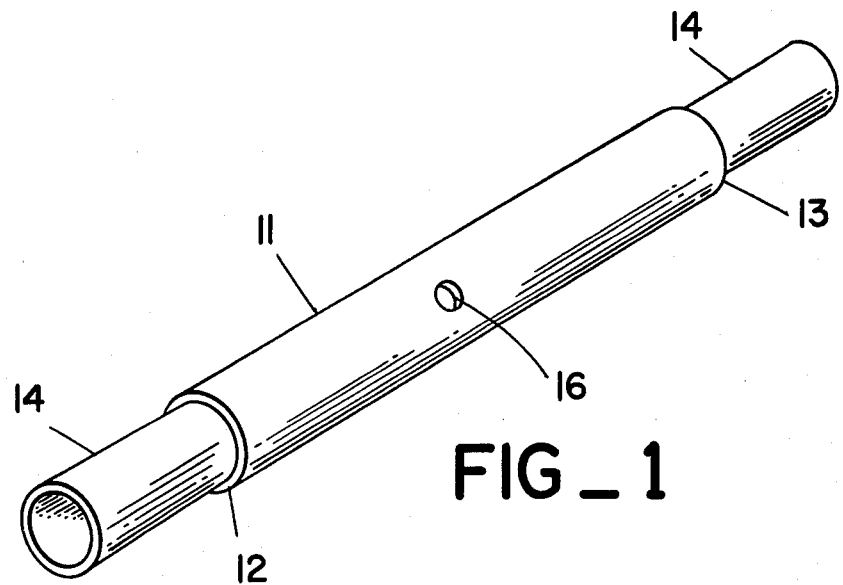
FIG_1
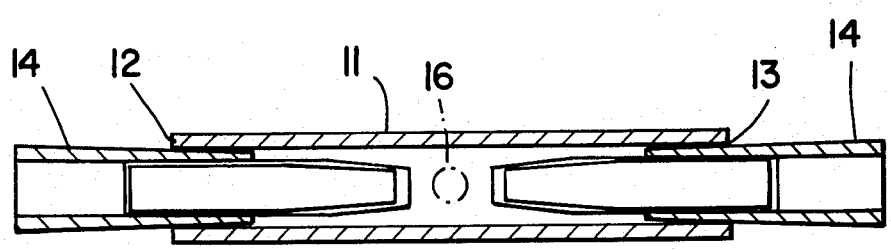
FIG_2
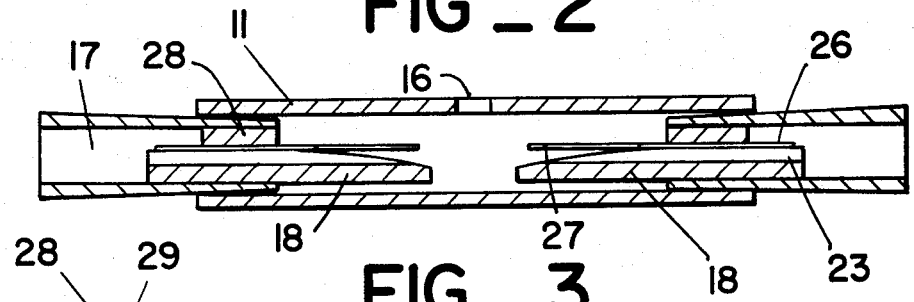
FIG_3
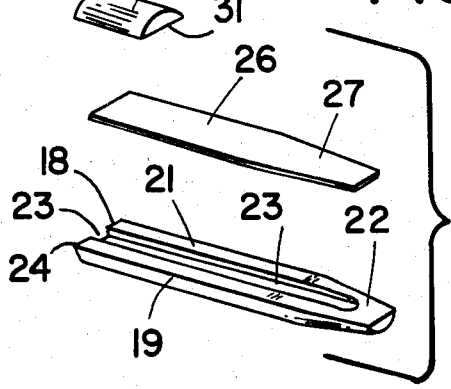
FIG_5
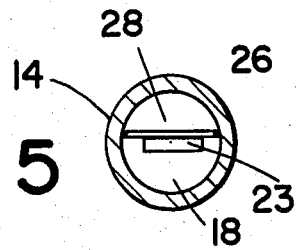
FIG_4

WILD GOOSE AND DUCK CALL

BACKGROUND OF THE INVENTION

There are known in the prior art many devices for mimicking the calls of geese, ducks, and other game birds, primarily for the purpose of luring the birds into proximity with hunters or birdwatchers. Generally speaking, these prior art devices have included a hollow tubular body having a mouthpiece or blow hole at one end and at least one reed assembly within the tubular body for producing the desired sound when activated by the air stream directed thereby.

In many situations it is advantageous to have a birdcall which can mimic the sounds of more than one bird species. For example, a hunter requires a birdcall which can mimic the different sounds of various geese as well as the various duck species which may be hunted. In the prior art, some birdcalls have included two or more reed assemblies within the same tubular body to create these differing sounds. These devices included stops, lever arrangements, or finger holes to direct the airstream to the reed assembly or assemblies which produce the desired sound. These devices have tended to become overly complicated and difficult to master. Furthermore, the increased complexity of these devices makes them more difficult to operate in the harsh field conditions in which they are often used.

The following U.S. Pat. Nos. comprise the most pertinent prior art: 3,955,313, 3,991,513, 3,066,443, 3,029,554, 2,835,077, 2,518,616, 2,396,359.

SUMMARY OF THE PRESENT INVENTION

The present invention generally comprises a game call which is particularly adapted to produce sounds which mimic the calls of wild geese and ducks. The invention is particularly characterized by a construction which is extremely simple to use in the harshest environmental conditions, and which facilitates the production of a single sound or two sounds simultaneously. Furthermore, the sounds produced by the invention may be tuned or adjusted to mimic exactly a particular animal or bird call.

The invention includes a hollow tubular body which is open at both ends and which is provided with a blow hole extending through the side wall thereof intermediate of the open ends. A removable reed assembly is secured in each of the open ends, with the free end of the reed extending inwardly from the assembly toward the blow hole.

Each of the reed assemblies includes a hollow, truncated conical member which is received narrow end first in an open end of the body member. An axially disposed tongue extends from the truncated portion of the conical member, and is provided with a tapered distal end. A groove-like air channel extends longitudinally in the tongue, with a flat, longitudinally extending reed disposed directly adjacent to the air channel. A compression plug impinges on a portion of the reed and retains the tongue and reed within the conical member. The free end of the reed which confronts the tapered portion of the tongue at its intersection with the air channel is adapted to vibrate whenever air passes from the blow hole across the free end of the reed and out through the air channel and the hollow opening of the conical member.

Either one of the conical members may be manually occluded to prevent air passing through the associated reed assembly, so that the other reed assembly may sound. Alternatively, both conical members may be left open so that both reed assemblies sound simultaneously. Furthermore, the conical members are dimensioned so that the output hole thereof may be selectively muffled to alter the intonation of the sound emanating therefrom.

Furthermore, the present invention is designed so that each of the conical members may be removed from the tubular body, and the reed assembly may be removed from its associated conical member. The freely vibrating longitudinal extent of each reed may be selectively adjusted to alter the fundamental and harmonic tones produced by the reed. The reed assembly may be quickly reinstalled in the conical member, and the conical member in turn is easily replaced in the tubular body. Thus it is possible to alter easily the sounds produced by the invention so that calls produced by wild birds and animals may be mimicked exactly.

A BRIEF DESCRIPTION OF THE DRAWING

FIG. 1 is a perspective view of the wild goose and duck call of the present invention.

FIG. 2 is a longitudinal cross-section of the present invention.

FIG. 3 is a longitudinal cross-section of the present invention, taken in a plane at right angles to the view of FIG. 2.

FIG. 4 is an end view of the reed assembly of the present invention.

FIG. 5 is an exploded view of the reed assembly of the present invention.

DESCRIPTION OF THE PREFERRED EMBODIMENT

As shown in the accompanying figures, the present invention generally comprises a hollow tubular body 11 having opposed open ends 12 and 13. The tubular body 11 may be formed of plastic or metal, but it is preferably formed of a soft wood which easily absorbs moisture, condensation, and saliva. Disposed medially of the ends 12 and 13 is a blow hole 16 which extends through the side wall of the tubular member 11.

Received in each of the open ends 12 and 13 is a reed assembly 14. Each reed assembly 14 includes a truncated conical member which is provided with an axially disposed bore 17 extending therethrough. The conical member is received in the open end 12 or 13 truncated end first. The conical shape provides a natural wedging action which retains the reed assembly in the open end and also permits easy removal of the reed assembly.

With reference to FIGS. 4 and 5, each reed assembly includes a longitudinally extending tongue 18 which is provided with a longitudinally extending cylindrical surface 19. The tongue includes a planar surface 21 which is opposed to and intersecting with the cylindrical surface 19. A distal portion 22 of the planar surface 21 is ramped toward the cylindrical surface 19; the width of this portion of the tongue is also tapered slightly. A groove-like air channel 23 extends longitudinally in the planar face 21, from the end 24 into the ramped portion 22.

The invention also includes a reed 26 which is formed of a longitudinally extending thin, flat, flexible member of plastic, metal, or the like. The reed 26 has the same general shape as the planar surface 21, including a portion 27 having a tapered width corresponding to the portion 22 of the tongue 18.

Each reed assembly also includes a compression plug 28. The compression plug is less than half the length of the tongue 18, and includes a cylindrical surface 29 joining a planar surface 31. It should be noted that the cylindrical surfaces 19 and 29 have radii of curvature which are substantially identical to the radius of curvature of the bore 17. The end 24 of the tongue 18 and the corresponding end of the reed 26 are received in the truncated end of the bore 17. The compression block 28 is oriented so that the planar surface 31 impinges on the reed 26 which in turn impinges on the planar surface 21. It should be noted that the portion 27 of the reed 26 extends freely from the portion of the reed which is engaged by the compression block 28. The reed portion 27 is caused to vibrate by an airstream introduced through the hole 16 and passing through the air channel 23 and the bore 17 to the exterior of the instrument.

It may be appreciated that the longitudinal extent of the freely vibrating portion determines the tone which is produced by that vibrating portion. The length of the freely vibrating portion 27 may be altered by disassembling the reed assembly 14 and reassembling the parts thereof with more or less of the portion 27 extending freely into the cavity of the hollow tubular body. Thus each reed assembly easily may be tuned to whatever sound is desired.

In the preferred embodiment each reed assembly is tuned to a slightly different tone, i.e., one to mimic the sound of ducks and the other to mimic the sound of geese. With both of the bores 17 open, air introduced into the blow hole 16 will set both reeds into vibration, causing a complex sound output. The outer extent of the conical members may be grasped manually and muffled to produce the desired combination of the differing tones. Alternatively, one of the bores 17 may be selectively occluded by a thumb or finger so that only the other reed assembly may sound. By altering the actuation of the different reed assemblies and muffling the outputs thereof, one may easily produce calls which closely mimic the calls of wild geese and ducks.

I claim:

1. A bird call comprising a hollow tubular body open at both ends, a blowhole in said tubular body intermediate of said ends, a pair of reed assemblies, each disposed in one of said ends of said tubular body, each of said reed assemblies including a reed having a freely vibrating end extending inwardly into said tubular body and adapted to be actuated by an airstream introduced through said blowhole.

2. The bird call of claim 1, wherein each of said reed assemblies includes a truncated conical member having a bore therethrough, said member being received narrow end first in one of said ends of said tubular body.

3. The bird call of claim 1, wherein said reed assembly includes a longitudinally extending tongue having a longitudinally extending air channel therein, said reed being disposed in confronting relationship to said tongue and said air channel.

4. The bird call of claim 3, further including a compression plug for impinging on and removably securing said reed and said tongue in said bore.

5. The bird call of claim 1, wherein the length of said freely vibrating end of said reed is adjustable to alter the tone produced by said reed.

6. The bird call of claim 3, wherein said tongue includes a ramped portion extending away from said freely vibrating end.

7. The bird call of claim 6, wherein said ramped portion of said tongue is tapered in width.

8. The bird call of claim 6, wherein said air channel terminates in said ramped portion of said tongue and extends continuously to the opposite end of said tongue.

9. The bird call of claim 1, wherein said freely vibrating ends of both said reeds are disposed in close proximity to said blowhole in said tubular body.

* * * * *